United States Patent
Slater

Patent Number: 5,917,971
Date of Patent: Jun. 29, 1999

[54] CONFOCAL DATA COLLECTION IN A FIBER OPTICALLY COUPLED MICROSCOPE

[75] Inventor: Joseph B. Slater, Dexter, Mich.

[73] Assignee: Kaiser Optical Systems, Ann Arbor, Mich.

[21] Appl. No.: 08/918,314

[22] Filed: Aug. 26, 1997

Related U.S. Application Data

[XX .
[60] Provisional application No. 60/024,617, Aug. 26, 1996.

[51] Int. Cl.⁶ .................................................. G02B 6/26
[52] U.S. Cl. .............................. 385/31; 385/33; 385/93; 385/147
[58] Field of Search .................................. 385/31, 15, 33, 385/34, 35, 38, 39, 88, 92, 93, 123, 124, 147

[56] References Cited

U.S. PATENT DOCUMENTS 5,815,626  9/1998  Kuba et al. ............................... 385/31

Primary Examiner—Phan T. H. Palmer
Attorney, Agent, or Firm—Gifford, Krass, Groh, Sprinkle, Anderson & Citkowski, PC

[57] ABSTRACT

A multimode optical fiber is used in a confocal light-collection arrangement. A confocal aperture is supported in intimate proximity with respect to the first end of the fiber, preferably within two core diameters from the first end of the fiber. In the preferred embodiment, the confocal aperture is formed directly onto the first end of the fiber using, for example, photolithography or photoablation of a thin metallic film adhered directly to the light-collection end of the multimode fiber.

8 Claims, 1 Drawing Sheet

CONFOCAL DATA COLLECTION IN A FIBER OPTICALLY COUPLED MICROSCOPE

REFERENCE TO RELATED APPLICATION

This application claims priority of U.S. Provisional Application Ser. No. 60/024,617, filed Aug. 26, 1996, the entire contents of which are incorporated herein by reference.

FIELD OF THE INVENTION

The present invention relates generally to the collection of optical spectra from a sample for analysis as in Raman spectroscopy and, in particular, to methods and apparatus associated with confocal microscopy.

BACKGROUND OF THE INVENTION

Confocal Raman microscopy is a useful analysis technique which has been employed for many years. The basis of the technique relies on collecting Raman scattered light from a sample through a coincident or "confocal" aperture. The fundamental configuration of a confocal microscope is shown in FIG. 1. Light from a spatially small, spectrally pure source (typically a diffraction limited laser beam) is brought to a focus onto the sample through a microscope objective. The light enters the optical path of the objective by means of a beam combining element (typically a wavelength selective mirror which is generally a holographic element). The scattered Raman light is collected traveling backwards through the same objective. Because the Raman scatter comprises different wavelengths than the one to which the beam combining element is tuned, it passes through the combiner and is imaged into the confocal aperture. The light passing through the confocal aperture is then presented to a spectrograph for analysis. The net effect of this arrangement is to restrict the collection of Raman scatter to the small volume of the sample coincident with focused light source. This restriction of the sample space allows the isolation of small volumes of the sample from the surrounding material. Taking a number of successive data collections at different points allows the development of three-dimensional profiles of transparent samples.

Fiber optically coupled Raman microscopes have become popular recently. These devices deliver the laser light and collect the Raman scatter via fiber optics. For true confocal performance the laser light must be diffraction limited and the collection aperture must be approximately the same size as the diffraction limited spot on the sample. A singlemode fiber can be utilized to deliver the diffraction limited laser beam to the microscope, the difficulty is in the confocal collection aperture. Using a singlemode (SM) collection fiber would provide the necessary confocality, however the numerical aperture of SM fibers is quite low yielding poor data collection efficiencies. In addition, interference effects in SM fibers contaminates the Raman data. A better solution from the point of view of collection efficiency and interference effects would be to use a multimode (MM) collection fiber. Unfortunately the core size of the MM fiber is too large to be an effective confocal aperture.

SUMMARY OF THE INVENTION

The present invention overcomes existing shortcomings in the art by enabling a multimode optical fiber to be used in a confocal light-collection arrangement. Broadly, and in general terms, the apparatus includes a multimode optical fiber having a first end to receive the light to be analyzed and a second end to deliver the light to be analyzed to analytical instrumentation. The confocal aperture is supported in intimate proximity with respect to the first end of the fiber, preferably within two core diameters from the first end of the fiber. In the preferred embodiment, the confocal aperture is formed directly onto the first end of the fiber using, for example, photolithography or photoablation to create an aperture in a metallic coating.

DETAILED DESCRIPTION OF THE INVENTION

Figure 1:
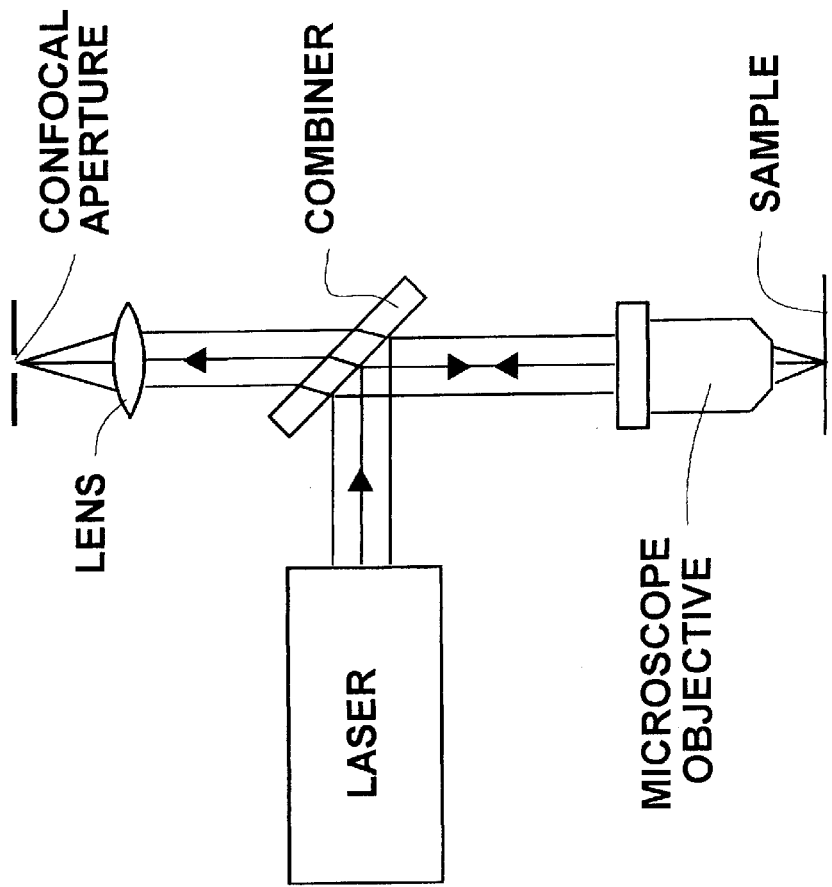
FIG. 1 is a depiction of a confocal microscope arrangement as might be used in Raman spectroscopy.

As discussed in the Background of the Invention, FIG. 1 illustrates a confocal microscopy arrangement wherein light received from a sample passes through a combiner and is imaged onto a confocal aperture. Before proceeding, it should be noted that although this specification makes reference to a "microscope," the apparatus involved should be more broadly interpreted to mean any type of confocal arrangement wherein spectral emissions collected from a sample are carried by an optical waveguide, as might be found in remote "probeheads" and other instrumentation.

Figure 2:
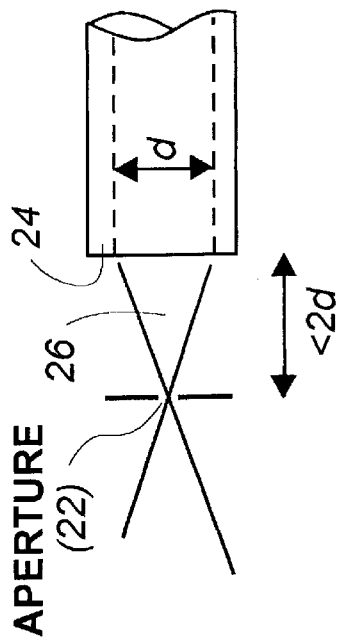
FIG. 2 is a close-up, simplified view of the point wherein light to be analyzed is introduced into a multi-mode optical fiber according to the invention.
Figure 3:
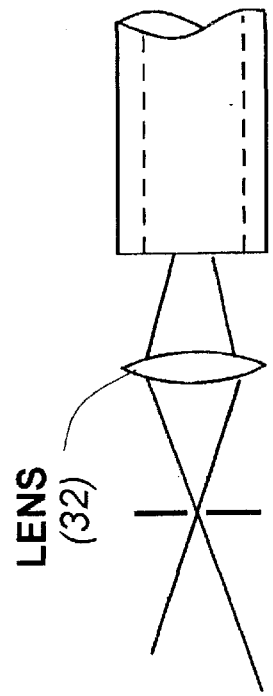
FIG. 3 illustrates an embodiment of the invention where a lens is used to re-focus the light emanating from the proximal end of a collection fiber.

As discussed above, to adapt this arrangement to a fiber-based configuration, a single-mode optical fiber may be used either to deliver the diffraction-limited laser beam to the microscope or to carry the light to be analyzed to appropriate instrumentation, however, according to the present invention, a multi-mode collection fiber is utilized for greater collection efficiency. To solve the problem associated with the large core size associated with multi-mode fibers, according to the instant invention, a small aperture is disposed in intimate proximity to the receiving end of the collection fiber. As shown in broken-line form in FIG. 2, although a discrete apertured element 22 may be utilized, according to this invention, it would be preferably placed as close as possible to the end 24 of the fiber to ensure that the greatest amount of the divergence angle 26 is captured within the core of the fiber. Typically, according to this invention, the aperture is preferably within two fiber core diameters (d) from the core in terms of spacing to avoid excessive spread of the beam prior to impinging upon the fiber tip. In the event of undesirable dispersion of the beam, a lens 32 may be used to re-focus the light emanating from the collection fiber, as shown in FIG. 3.

In the preferred embodiment, a multi-mode fiber having an appropriate numerical aperture is selected, and the end is coated with a suitable material such as chrome, after which an aperture may be produced, either photolithographically or through photo ablation of the coating with a suitable high-powered laser. It has been found through experiment that photolithographic techniques may be used to produce a suitably sized aperture, which will typically be on the order of several microns in diameter. That is to say, the receiving end of the fiber may be coated with a material which is substantially opaque in very thin form, using a metal such as chromium, then coated with a photoresist and exposed by focusing a radiating beam at the site of the aperture to be formed. Upon development of the resist end, using etching techniques standard in the microelectronics industry, a suitable aperture is formed. This arrangement then allows the high collection efficiency associated with the multi-mode fiber to be utilized with the confocal characteristics of a single mode fiber.

That claimed is:

1. In a light-collection arrangement wherein light to be analyzed is focused onto a confocal aperture, light-collection apparatus comprising:

a multimode optical fiber having a first end to receive the light to be analyzed and a second end to deliver the light to be analyzed to analytical instrumentation; and a confocal aperture supported in intimate proximity with respect to the first end of the fiber.

2. The light-collection apparatus of claim 1, wherein the confocal aperture is formed directly onto the first end of the fiber.

3. The light-collection apparatus of claim 2, wherein the confocal aperture is formed by depositing a thin metallic layer onto the first end of the fiber and forming a microscopic hole into the thin metallic layer.

4. The light-collection apparatus of claim 1, where the multimode optical fiber has a core diameter, and wherein the confocal aperture is within two core diameters from the first end of the fiber.

5. The light-collection apparatus of claim 1, further including a focussing optical element disposed between the confocal aperture and the first end of the fiber.

6. A method of forming a confocal aperture onto the end of an optical fiber, comprising the steps of:

providing a multimode optical fiber having an end;

depositing a substantially thin, optically opaque layer onto the end of the fiber; and forming a microscopic aperture through the thin, optically opaque layer.

7. The method of claim 6, wherein the step of forming the microscopic aperture through the thin, optically opaque layer includes the step of forming the aperture photolithographically.

8. The method of claim 6, wherein the step of forming the microscopic aperture through the thin, optically opaque layer includes the step of forming the aperture through photoablation.

* * * * *